United States Patent
Passebecq et al.

(10) Patent No.: US 6,808,218 B1
(45) Date of Patent: Oct. 26, 2004

(54) DASHBOARD IN PARTICULAR FOR MOTOR VEHICLE

(75) Inventors: Ghislain Passebecq, Trappes Neauphle le Vieux (FR); Jean Dauvergne, Trappes Fosses (FR)

(73) Assignees: Valeo, Paris (FR); Visteon System Interieures, La Defense (FR)

( * ) Notice: Subject to any disclaimer, the term of this patent is extended or adjusted under 35 U.S.C. 154(b) by 0 days.

(21) Appl. No.: 10/031,590
(22) PCT Filed: Jul. 21, 2000
(86) PCT No.: PCT/FR00/02113
§ 371 (c)(1), (2), (4) Date: Jun. 5, 2002
(87) PCT Pub. No.: WO01/07283
PCT Pub. Date: Feb. 1, 2001

(30) Foreign Application Priority Data

Jul. 23, 1999 (FR) .............................. 99 09752

(51) Int. Cl.$^7$ .............................................. B62D 25/14
(52) U.S. Cl. ........................................................ 296/70
(58) Field of Search ...................... 296/70, 208; 180/90

(56) References Cited

U.S. PATENT DOCUMENTS

| 5,333,901 | A |   | 8/1994  | Barnes |
|-----------|---|---|---------|--------|
| 5,709,601 | A |   | 1/1998  | Heck |
| 5,938,266 | A | * | 8/1999  | Dauvergne et al. ........... 296/70 |
| 5,997,078 | A | * | 12/1999 | Beck et al. ................... 296/70 |
| 6,705,672 | B2| * | 3/2004  | Shikata et al. ............... 296/208 |

FOREIGN PATENT DOCUMENTS

| EP | 0607585 A1 | * | 7/1994 |
| FR | 2 758 783  |   | 7/1998 |

* cited by examiner

Primary Examiner—Jason Morrow
(74) Attorney, Agent, or Firm—Young & Thompson

(57) ABSTRACT

A dashboard, in particular for motor vehicle, includes at least a three-dimensional element (2) extending longitudinally and designed to constitute a reinforcement against impact and to enable equipment items to be incorporated (1) in the dashboard. The three-dimensional element (2) includes a body (3), designed in volume and provided with housings (4) for the equipment items (1), arranged in the volume of the body (3), and a substantially planar component (5), co-operating with the body to close at least some of the housings.

9 Claims, 1 Drawing Sheet

DASHBOARD IN PARTICULAR FOR MOTOR VEHICLE

BACKGROUND OF THE INVENTION

The present invention relates to a dashboard, especially for a motor vehicle.

However, although more particularly developed for such applications, the present invention could also be used in all those fields of economic activity in which driving, control and/or monitoring stations are likely to be encountered.

DESCRIPTION OF THE RELATED ART

At the present time, in the automobile field, flat-shaped dashboards have been developed, that is to say dashboards with walls of shallow thickness, comprising housings making it possible internally to accommodate, at the locations provided for this purpose, equipment elements such as the various components of a heating, ventilation and/or air-conditioning circuit, for example, these also, however, defining difficult and unusable geometric regions.

The housings are themselves also flat in shape, that is to say with walls of shallow thickness the relative positions of which define the location of the components as well as ducts for the circulation of an airflow between them. The housings are held in place by way of reinforcing elements provided at the front of the vehicles, especially a crosspiece.

Such solutions already constitute progress in terms of the degree of integration by comparison with preceding dashboards in which all the components were brought in, put in place and fixed one by one, by specific assembly operations. Nevertheless, they remain inadequate.

First of all, certain equipment elements still have to be attached to the crosspiece, or elsewhere, in specific assembly operations.

Moreover, the coexistence between the housings and the crosspiece is an intricate matter. This is because it does not allow optimisation of the take-up of the available space, especially by reason of the shape of the housings and of their arrangement in a plane orthogonal to the crosspiece.

It should also be noted that the crosspiece and the housings are of different technologies and thus require separate manufacturing operations.

BRIEF SUMMARY OF THE INVENTION

The object of the present invention is to propose a dashboard which overcomes the above-mentioned drawbacks and makes it possible to enhance the degree of integration of these equipment elements.

Another object of the present invention is to propose a dashboard allowing optimisation of the available space.

Other objects and advantages of the invention will emerge in the course of the description which will follow which is given only by way of indication and which is not for any limiting purpose.

The invention relates to a dashboard, especially for a motor vehicle, with at least of one three-dimensional element, able to allow the integration of equipment elements into the dashboard, characterised in that the three-dimensional element, designed extending longitudinally, consists of a body, shaped in volume and equipped at least with housings for the equipment elements, which are produced in the mass of the body, and of a substantially flat-shaped piece, interacting with the body so as to close at least some of the housings.

BRIEF DESCRIPTION OF THE DRAWINGS

The invention will be better understood on reading the following description, accompanied by FIG. 1 in the annex which forms an integral part thereof and which describes, in a cross-sectional plane, an embodiment for example of the dashboard in accordance with the invention.

DESCRIPTION OF THE PREFERRED EMBODIMENTS

Figure 1:
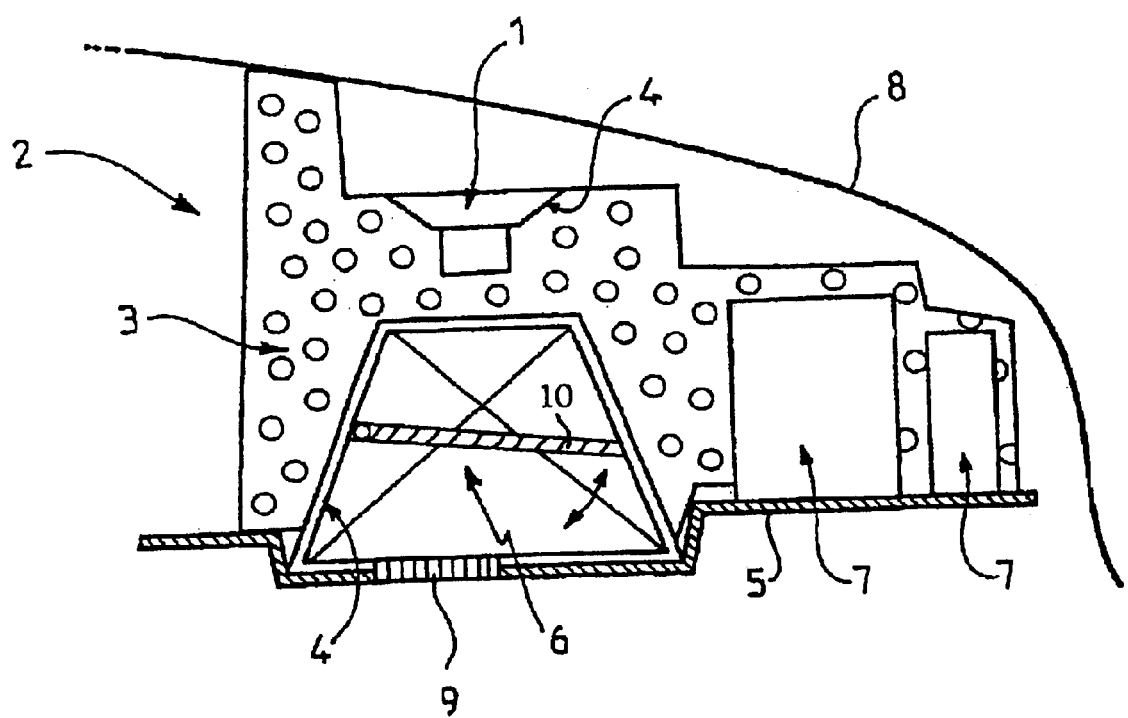

The present invention relates to a dashboard, specially for a motor vehicle.

However, although more particularly intended for such applications, the present invention could also be used in all those fields of economic activity in which driving, control and/or monitoring stations are likely to be encountered.

As illustrated in FIG. 1, the dashboard in accordance with the invention comprises at least of one three-dimensional element 2, able to allow the integration of equipment elements 1 into the dashboard as well as, if appropriate, to constitute a reinforcement especially against frontal and lateral impacts.

According to the invention, the three-dimensional element 2 extends longitudinally. Moreover, the three-dimensional element 2 comprises a body 3, designed in volume and equipped at least with housings 4 for the equipment elements 1. The housings are produced in the mass of the body 3. The three-dimensional element 2 also comprises a substantially flat-shaped piece 5, interacting with the body 3 so as to close at least some of the housings 4 and duct 7 as well as, if appropriate, as set out later, in order to participate in the definition of them which are also formed in the mass of the body 3.

Thus a solution is available making it possible to integrate into the mass of the body 3 and into the housings are large number of equipment elements such as, for example, as explained later, ventilation, heating and/or air-conditioning means 6, but also functionally different equipment elements such as loudspeakers, inflatable cushion or airbag or other safety devices.

Moreover, with such elements no longer having to be fixed to the surface of the dashboard, the production of the latter can be carried out in a more aesthetically free way. Likewise, this gets round the production of difficult and unusable geometric regions, as is necessarily the case in the known flat-shaped dashboards.

In the case of applications to a motor vehicle, the three-dimensional element 1, in particular the flat-shaped piece 5, could constitute the front crosspiece thereof and thus reinforce the resistance of the vehicle to impacts, especially lateral and/or frontal impacts.

That being so, as mentioned above, the three-dimensional element 2 is furthermore intended to be able, for example, to allow at least the circulation of an airflow for the ventilation, heating and/or air-conditioning, between at least means 6 for ventilation, heating and/or air-conditioning, an air inlet and/or an air outlet 9. The ventilation, heating and/or air-conditioning means are distributed substantially in the same plane parallel to the longitudinal direction of the three-dimensional element 2.

Thus optimisation of the available space is obtained. Moreover, in the case of applications to vehicles, the components of the ventilation, heating and/or air-conditioning means, which are generally among the heaviest equipment elements of the dashboard, may remain close to the bulkhead, which makes it possible to facilitate their stability.

The ventilation, heating and/or air-conditioning means 6 are provided, for example, in the region of at least some of the housings 4 of the body of the three-dimensional element, the body 3 moreover being equipped with ducts 7, produced in the mass, between the ventilation, heating and/or air-conditioning means 6, the air inlet or inlets and the air outlet or outlets 9.

The longitudinal axis of the three-dimensional element 2 is oriented, especially, substantially horizontally. Furthermore, the air inlet or inlets and/or the air outlet or outlets are comprised, for example, of orifices provided at the surface of the three-dimensional element 2.

The trajectory of the airflow in the three-dimensional element 2 is substantially flat, for example. This is understood to mean that the circulation of the airflow takes place in the plane in which the ventilation, heating and/or air-conditioning means 6 are arranged and/or in the vicinity of the latter in the case of slight deviations of the airflow by reason of the treatment operations undergone such as, for example, its acceleration in the region of the ventilation means, the use or otherwise of the air-conditioning and/or heating means and/or other operations. The plane is called flow plane in what follows.

The ventilation, heating and/or air-conditioning means 6 are, especially, substantially aligned behind one another, in the direction of the flow, along the longitudinal direction of the three-dimensional element 2.

The air inlet or inlets and/or the air outlet or outlets are, for example, situated substantially in the flow plane.

To construct the body 3, it would be possible, especially, to use a foam plastic and/or expanded plastic such as, for example, polypropylene and/or also expanded and compressed polystyrene beads. Advantageously, certain body regions 3 may serve as impact dampers. To that end, for example, it features overthicknesses of material, especially of foam, in the regions. The cover comprises a material giving the three-dimensional element its rigidity.

The flat-shaped piece 5 could be designed to be able, especially, to constitute a support for additional equipment elements, for example heavily stressed elements, such as a steering column, an inflatable cushion or airbag-type safety system, a pedal frame and/or other systems, which require structural characteristics and/or characteristics of vibration resistance. To that end, it will be dimensioned to withstand the forces of use, but also to filter vibration.

The body 3 could extend, in volume, especially, towards the surface 8 of the upper part of the dashboard, so as, if appropriate, at least partly to define the latter, the flat-shaped piece 5 closing the housings 4 of the body 3 at its lower part.

Some of the ducts 7 produced in the mass of the body 3 could moreover be provided downstream of the ventilation, heating and/or air-conditioning means 6, so as, if appropriate, to open out at the level of the air outlet or outlets, provided at the surface of the dashboard, especially for deicing/demisting. The body 3 thus moreover defines air diffusers on the surface of the dashboard.

The three-dimensional element 2 could, furthermore, if appropriate, comprise means for selection of the path of the airflow. The latter may comprise, especially, movable flaps 10, arranged, among others, at the level of the air inlet or inlets, so as to vary the origin of the air introduced, in terms of the heating means, so as to vary the temperature of the airflow, and/or downstream of the latter, so as to alter the direction of the airflow emitted.

That being so, the ventilation, heating and/or air-conditioning means consist, for example, respectively of a blower, of a radiator and of an evaporator.

The three-dimensional element 2 is able, moreover, if appropriate, to accommodate one or more filters, provided for example in the flow plane. The filters are thus, especially, substantially aligned with the blower, the radiator and/or the evaporator.

If it is not wished to condition the airflow, it is sufficient to neutralise the effects of the evaporator and/or to dispense with it.

Naturally, other embodiments, within the scope of the person skilled in the art, could have been envisaged without to any extent is departing from the context of the invention.

What is claimed is:

1. Dashboard, comprising:

at least of one three-dimensional element (2), able to allow the integration of equipment elements (1, 6) into the dashboard, characterised in that the three-dimensional element (2), extending in a longitudinal direction, comprises a single body (3), shaped in volume and equipped at least with housings (4) for the equipment elements (1, 6), which are produced in the mass of the body (3), and a substantially flat-shaped piece (5), interacting with the body so as to close at least some of the housings, the body (3) extending in volume towards the surface of the upper part of the dashboard, the flat-shaped piece (5) closing the housings (4) of the body at its lower part.

2. Dashboard according to claim 1, in which the three-dimensional element (2) is further intended to be able to allow at least the circulation of an airflow for the ventilation, heating and/or air-conditioning, between at least means (6) for ventilation, heating and/or air-conditioning, an air inlet and/or an air outlet (9), the ventilation, heating and/or air-conditioning means being distributed substantially in a plane parallel to the longitudinal direction of the three-dimensional element (2).

3. Dashboard according to claim 2, in which the ventilation, heating and/or air-conditioning means (6) are provided in the region of at least some of the housings (4) of the body of the three-dimensional element, the body (3) moreover being equipped with ducts, produced in the mass, between the ventilation, heating and/or air-conditioning means (6), the air inlet and/or the air outlet.

4. Dashboard according to claim 3, wherein another of the housings (4) is designed to be able to accommodate an equipment element (1) functionally different from the ventilation, heating and/or air-conditioning means (6).

5. Dashboard according to claim 1, in which the body (3) at least partly defines the surface of the upper part of the dashboard.

6. Dashboard according to claim 1, in which the flat-shaped piece (5) is moreover able to constitute a support for additional equipment elements.

7. Dashboard according to claim 1, in which the body (3) features regions able to serve as impact dampers.

8. Dashboard according to claim 2, in which the three-dimensional element (2) comprises means for selection of the path of the airflow.

9. Dashboard according to claim 8, in which the selection means consist of movable flaps (10) arranged:

in the region of the air inlet, so as to vary the origin of the air introduced, in the region of a heating means, so as to vary the temperature of the airflow, downstream of the heating means, so as to vary the direction of the airflow emitted.

* * * * *

UNITED STATES PATENT AND TRADEMARK OFFICE
CERTIFICATE OF CORRECTION

PATENT NO. : 6,808,218 B1 Page 1 of 1
APPLICATION NO. : 10/031590
DATED : October 26, 2004
INVENTOR(S) : Ghislain Passebecq and Jean Dauvergne It is certified that error appears in the above-identified patent and that said Letters Patent is hereby corrected as shown below:

On the title page, amend Item (73), to read as follows:  --(73) Assignees:  Valeo, Paris (FR); Visteon Systemes Interieurs, La Defense (FR)--.

Signed and Sealed this

Fourteenth Day of August, 2007

JON W. DUDAS
*Director of the United States Patent and Trademark Office*